United States Patent [19]

Lavrentiev et al.

[11] 4,210,945

[45] Jul. 1, 1980

[54] ROTARY MAGNETIC HEAD ASSEMBLY

[76] Inventors: Konstantin A. Lavrentiev, ulitsa Kutsygina, 6, kv. 97; Svyatoslav D. Kretov, Leninsky prospekt, 153, kv. 59; Alexandr G. Koshelev, Leninsky prospekt, 189, kv. 87, all of Voronezh, U.S.S.R.

[21] Appl. No.: 939,338

[22] Filed: Sep. 5, 1978

[51] Int. Cl.² .............................................. G11B 5/20
[52] U.S. Cl. .................................................. 360/108
[58] Field of Search ........................................ 360/108

[56] References Cited

U.S. PATENT DOCUMENTS 4,031,558  6/1977  Kusaka ................................. 360/108

FOREIGN PATENT DOCUMENTS 927308  5/1963  United Kingdom ..................... 360/108

Primary Examiner—Robert S. Tupper
Attorney, Agent, or Firm—Lackenbach, Lilling & Siegel

[57] ABSTRACT

According to the invention, the rotary magnetic head assembly comprises a current-conducting housing which accommodates magnetic heads and a contactless signal transformer device. The magnetic heads are mounted on a holder secured on a hollow shaft. The contactless signal transformer device comprises a rotor mounted on the holder and a stator spaced at a certain distance from the rotor. The rotor and stator cores are closed magnetic circuits with helical windings. The center of each turn of said windings is on a circumference matched with the center line of each of the closed magnetic circuits. The hollow shaft accommodates a current-conducting element joined to the bottom and the lid of the housing so that the lid, walls and bottom of the housing and said current-conducting element make up a closed spatial coupling loop of the rotor and stator windings. The closed magnetic circuits of the rotor and stator encompass the current-conducting element.

30 Claims, 7 Drawing Figures

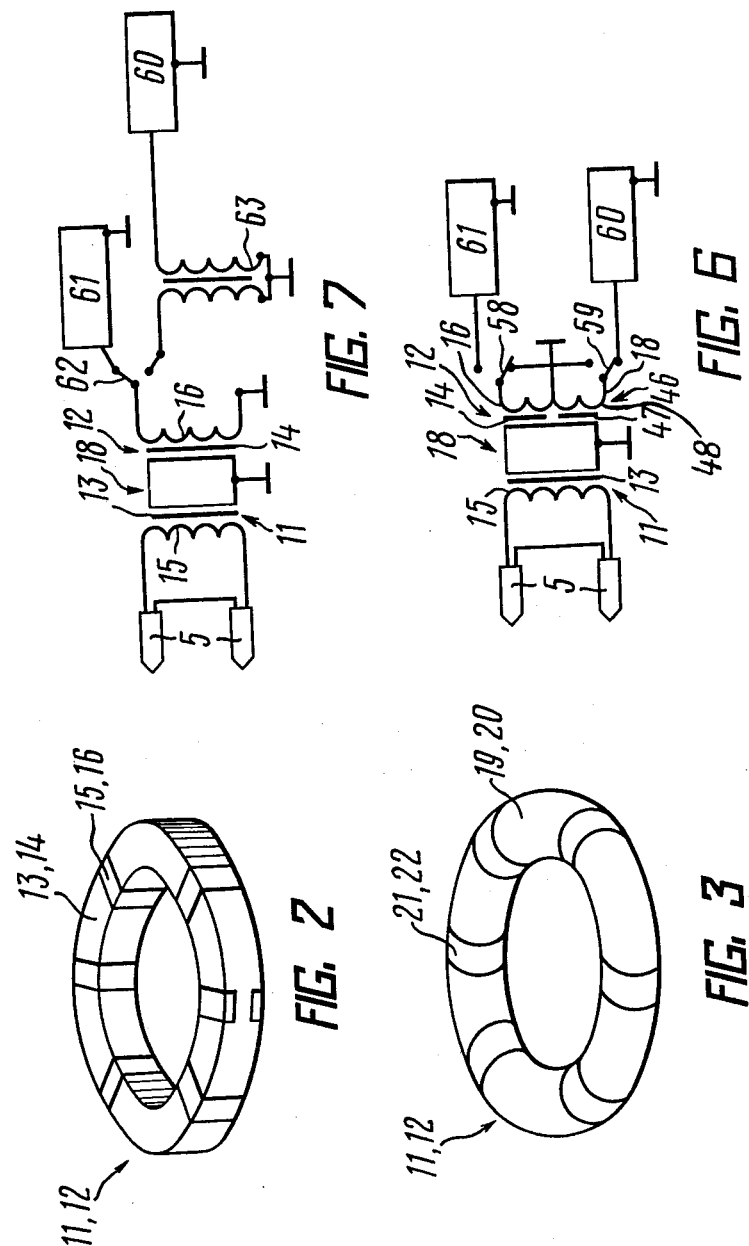

… …

ROTARY MAGNETIC HEAD ASSEMBLY

FIELD OF THE INVENTION

The present invention relates to video signal recording and reproduction equipment and, more particularly, to rotary magnetic head assemblies.

The invention can be used to advantage in household and professional video tape recorders.

DESCRIPTION OF THE PRIOR ART

There is known a rotary magnetic head assembly (cf. the rotary magnetic head assembly of the BK-200 video tape recorder manufactured by Grundig and described in the book by E. N. Travnikov "Mechanismy apparatury magnitnoy zapisi"/"Mechanisms of Magnetic Recording Equipment"/, Technika Publishers, Kiev, 1976, pp. 346-350) comprising a current-conducting housing having a bottom, walls and a lid and accommodating magnetic heads mounted on a holder secured on a shaft, and a contactless current-collecting device composed of a rotor mounted on the holder and a stator, the rotor and stator having cores with windings.

In the assembly under review, the rotor and stator cores are constructed as open magnetic circuits, namely, as ferrite disc cups coaxially arranged one above the other in parallel planes and spaced at a small distance of about 80 to 100 mu. The cups are provided with internal concentric annular grooves. The turns of the rotor and stator windings are arranged in said grooves. The rotor and stator windings are both constructed as a flat helix with coaxial turns. The stator winding is connected by means of a long wire to a step-up transformer disposed outside the rotary magnetic head assembly. There is no structural nor functional connection between the step-up transformer and the current-collecting device, which means that the current-collecting device and step-up transformer perform separate functions.

In the course of reproduction, a video signal is applied as electric current from the magnetic heads flows to the winding of the rotor where it produces a magnetic field to induce electric current in the stator winding. The magnetic coupled coefficient of the rotor and stator windings is determined by the width of the gap between the rotor and stator cores.

The assembly under review has a number of disadvantages. It is complicated in design and hard to manufacture. It is hard to remove and reinstall in place in case of some repair operation. Finally, it is not reliable enough. These disadvantages are due to the fact that the rotor and stator cores must be coaxial and parallel to each other and must also be spaced at a very small distance from one another. Besides, the current-collecting device of the assembly under review does not have an adequate noise immunity due to the high radiation capacity of its windings constructed as a flat helix with coaxial turns and mounted on the cores as open magnetic circuits arranged with a certain clearance. The assembly under review does not rule out occurrences of noise amplitude modulation which may impair the picture quality; in most cases the reason for such occurrences is that the rotor and stator cores are not coaxial and parallel to the desired degree. Finally, the signal transmission coefficient of the rotary magnetic head assembly under review is not high enough due to power losses because of inductive leakage in the conductor which connects the current-collecting device to the step-up transformer.

The above considerations make it clear that in an attempt to improve the performance of the assembly under review one must meet incompatible requirements. On the one hand, one must increase the width of the gap between the cores in order to simplify the design of the assembly, make it easier to manufacture, more reliable in operation and more convenient in maintenance; another reason for increasing the gap width is the elimination of noise amplitude modulation. On the other hand, it is necessary to reduce the gap width to improve the noise immunity of the assembly. However, if the width of the gap between the cores is reduced beyond certain limits, the current-collecting device may cease to perform its function of transmitting signals from the rotor to the stator and back.

There is also known a rotary magnetic head assembly (cf. the rotary magnetic head assembly of the N-1500 video tape recorder manufactured by Philips and described in the book by E. N. Travnikov "Mechanismy apparatury magnitnoy zapisi"/"Mechanisms of Magnetic Recording Equipment"/, Technika Publishers, Kiev, 1976, pp. 350-352) which is basically similar to the one described above. However, in this assembly the stator winding is connected by means of a short length of wire to a step-up transformer arranged inside the assembly housing. As in the other prior art device, there is no structural nor functional connection between the step-up transformer and the current-collecting device. The core of the step-up transformer is constructed as a closed magnetic circuit, namely, as ferrite disc cups which are rigidly coupled together in coaxial arrangement and provided with internal concentric annular grooves accommodating the turns of the core windings.

This type of assembly features a higher signal transmission coefficient that the other prior art device, which is due to the shorter length of the conductor connecting the step-up transformer to the current-collecting device and an ensuing reduction in power losses caused by inductive leakage.

At the same time the assembly under review suffers from all the disadvantages inherent in the type of assembly discussed above. These disadvantages are due to the necessity of having a very small gap between the rotor and stator cores of the current-collecting device, as well as the necessity of a coaxial and parallel arrangement of these cores. Besides, the assembly under review is not free from losses of power due to inductive leakage in the windings of the current-collecting device and the transformer.

There is also known a rotary magnetic head assembly (cf. Japanese Pat. No. 50-8767, Cl. H01F), wherein the current-collecting unit and the step-up transformer are combined into a single unit, although both remain functionally independent. The current-collecting device comprises a rotor and stator with cores constructed as ferrite disc cups. The rotor and stator windings are flat with coaxial turns. The current-collecting device includes an additional stator. The core of the additional stator and that of the main stator are combined into a single member composed of two ferrite disc cups rigidly coupled together. One of the windings of the additional stator serves as the primary winding of the transformer and is connected to the winding of the main stator. The second winding of the additional stator serves as the secondary winding of the transformer and is connected to the reproduction channel.

In the assembly under review, the current-collecting device and step-up transformer are combined into a single unit, which minimizes losses of power due to inductive leakage in the conductor connecting the two units.

Apart from this improvement, the assembly under review still suffers from all the disadvantages of the assemblies of the foregoing types, which are due to the small gap between the cores of the rotor and stator of the current-collecting device and the necessity of a coaxial and parallel arrangement of the cores. Another disadvantage of this assembly lies in the fact that there are two windings in the current-collecting device and two windings in the step-up transformer.

SUMMARY OF THE INVENTION

It is an object of the present invention to provide a rotary magnetic head assembly which would be simple to manufacture and easy to operate.

Another object of the invention is to provide a highly reliable rotary magnetic head assembly.

A further object of the invention is to provide a rotary magnetic head assembly featuring an improved noise immunity.

Still another object of the invention is to provide a rotary magnetic head assembly, wherein the probability of an occurrence of noise modulation would be reduced to a minimum.

Yet another object of the invention is to provide a rotary magnetic head assembly featuring an improved signal transmission coefficient.

These and other objects of the present invention are attained in a rotary magnetic head assembly comprising a housing having a bottom, walls and a lid and accommodating magnetic heads mounted on a holder secured on a shaft, and a contactless signal transformer device comprising a rotor mounted on the holder and a stator, the rotor and stator having cores with windings. The rotary magnetic head assembly, according to the invention, includes a current-conducting element accommodated in the shaft, which is made hollow for such purpose, and coupled to the bottom and lid of the housing so that the lid, walls and bottom of the housing and said current-conducting element make up a closed spatial coupling loop of the rotor and stator windings of the signal transformer device. The rotor and stator cores are constructed as closed magnetic circuits encompassing the current-conducting element and spaced at a certain distance from one another, the windings are constructed as a helix, the centers of the turns being on a circumference matched with the center line of each of the closed magnetic circuits.

It is expedient that the current-conducting element should be joined to the bottom of the housing by means of a current-conducting sleeve member combined with the housing of the rotary magnetic head assembly and the current-conducting element to form a closed spatial coupling loop of the rotor and stator windings, one of the ends of the current-conducting element being secured in the bottom of the sleeve member, which has its end face secured to the bottom of the housing and accommodates the stator of the current-collecting device.

It is desirable that the housing should be provided with a means for bringing the surface of the closed spatial coupling loop of the rotor and stator windings closer to the windings of the rotor and/or stator.

The means for bringing the surface of the closed spatial coupling loop of the rotor and stator windings closer to the rotor and/or stator windings may include a current-conducting ring arranged on the internal surface of the lid of the housing or the bottom of the sleeve member coaxially with the rotor or stator and encompassing, with a certain clearance, the external surface of the rotor or stator.

The means for bringing the surface of the closed spatial coupling loop of the rotor and stator windings closer to the rotor and/or stator windings may additionally include a current-conducting cylinder-shaped projection provided on the internal surface of the housing lid or the bottom of the sleeve member and arranged coaxially with the rotor or stator inside the latter and with a certain clearance therefrom.

It is preferable that the means for bringing the surface of the closed spatial coupling loop of the rotor and stator windings closer to the stator winding should additionally include a current-conducting ring-shaped plate mounted on the current-conducting ring coaxially with the stator and with a certain clearance from the stator and the current-conducting element.

It is preferable for the rotary magnetic head assembly, according to the invention, to be provided with an additional stator whose core is constructed as a closed magnetic circuit encompassing the current-conducting element, the winding of said additional stator being a helix, the centers of the turns being on a circumference matched with the center line of the closed magnetic circuit, first ends of the windings of the main and additional stator being interconnected and grounded. The assembly is further provided with two switches electrically connected to the second ends of the windings of the main and additional stators. In the course of reproduction the winding of the main stator is shorted and grounded by its respective switch, and the winding of the additional stator is connected by its respective switch to a reproduction channel and serves as the secondary winding of a step-up transformer. The primary winding of the transformer is the rotor winding and the core is the core of the rotor and that of the additional stator. In the course of recording the winding of the main stator is connected by its respective switch to a recording channel, and the winding of the additional stator is shorted and grounded by its respective switch.

It is preferable that each of the closed magnetic circuits should be constructed as a cylindrical ring.

Each of the closed magnetic circuits may be shaped as a torus.

It is preferable that the winding of the additional stator should have a greater number of turns than that of the main stator.

The additional stator may be accommodated in the current-conducting sleeve member, in immediate proximity to the main stator and arranged coaxially with it so that the current-conducting ring encompasses, with a certain clearance, the external surface of the additional stator, the current-conducting cylindrical projection being arranged inside the additional stator and coaxially with it, so that the surface of the closed spatial coupling loop of the rotor and main stator windings of the current-collecting device is brought closer to the winding of the additional stator.

According to the invention, the design of the rotary magnetic head assembly simplifies the manufacture and facilitates operation of the assembly, improves its noise immunity and reliability, and minimizes the possibility of noise amplitude modulation occurrences. In addition, the design of this invention makes it possible to improve the signal transmission coefficient and reduce the size of the cores of the current-collecting device.

BRIEF DESCRIPTION OF THE DRAWINGS

Other objects and advantages of the present invention will become more apparent from the following detailed description of preferred embodiments thereof, taken in conjunction with the accompanying drawings, wherein:

FIG. 2 is a perspective view of the rotor and stator core of the signal transformer device of the rotary magnetic head assembly of FIG. 1;

FIG. 3 is a perspective view of an alternative embodiment of the rotor and stator core of the signal transformer device of the rotary magnetic head assembly of FIG. 1;

FIG. 6 is an electrical diagram of the rotary magnetic head assembly of FIG. 5; and FIG. 7 is an electrical diagram of the rotary magnetic head assemblies of FIG. 1 or 4.

DETAILED DESCRIPTION OF THE INVENTION

Figure 1:
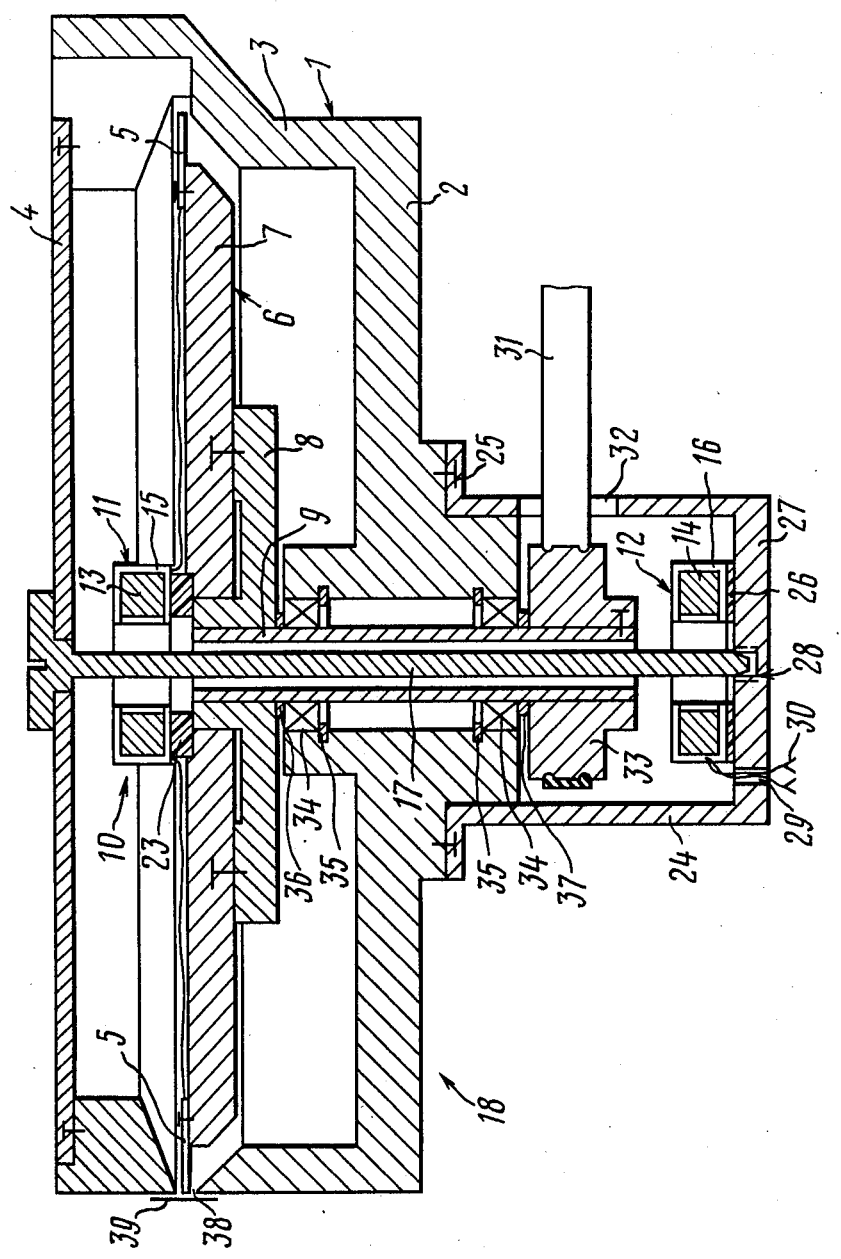
FIG. 1 is an elevational and sectional view of a rotary magnetic head assembly in accordance with the invention.

Referring to the accompanying drawings, the rotary magnetic head assembly in accordance with the invention comprises a current-conducting housing 1 (FIG. 1) having a bottom 2, walls 3 and a lid 4.

The housing 1 accommodates magnetic heads 5 mounted on a holder 6 which comprises a rocker arm 7 carrying the magnetic heads 5; the rocker arm 7 is mounted on a base 8 which, in turn, is mounted on a hollow shaft 9.

The housing 1 further accommodates a contactless signal transformer device 10 composed of a rotor 11 and a stator 12 having cores 13 and 14. Windings 15 and 16 are wound around the cores 13 and 14, respectively.

The hollow shaft 9 accommodates a current-conducting element 17 constructed as a current-conducting support and further referred to as the support 17. The support 17 is coupled to the bottom 2 (the manner in which the coupling is effected is described below) and to the lid 4 of the housing 1 so that the lid 4, walls 3 and bottom 2 of the housing 1 and the support 17 make up a closed spatial coupling loop 18 of the windings 15 and 16 of the rotor 11 and stator 12, respectively.

The cores 13 and 14 of the rotor 11 and stator 12, respectively, are constructed as closed ferrite magnetic circuits and further referred to as the magnetic circuits 13 and 14. These encompass the current-conducting support 17 and are spaced at a certain distance from one another. In the embodiment under review, each of the closed magnetic circuits 13 and 14 (FIG. 2) is a cylindrical ring. Each of the windings 15 and 16 is of the strip type and constructed as a helix, the centers of the turns being on a circumference matched with the center line of each of the closed magnetic circuits 13 and 14.

According to an alternative embodiment, cores 19 and 20 (FIG. 3) of the rotor 11 and stator 12, respectively, are constructed as torus-shaped closed ferrite magnetic circuits further referred to as the magnetic circuits 19 and 20; each of the windings 21 and 22 is a helix, and the centers of the turns are found on a circumference matched with the center line of each of the closed magnetic circuits.

The rotor 11 (FIG. 1) is mounted in immediate proximity to the lid 4 of the housing 1 on an insulating ring 23 secured on the holder 6. The ends of the winding 15 are connected to the magnetic heads 5 by means of any suitable electrical connectors.

The current-conducting support 17 is attached to the bottom 2 of the housing 1 by means of a current-conducting sleeve member 24 combined with the housing 1 of the rotary magnetic head assembly, the lid 4 and the support 17 to form the closed spatial coupling loop 18 of the windings 15 and 16 of the rotor 11 and stator 12, respectively. An end face 25 of the sleeve member 24 is attached to the bottom 2 of the housing 1. The sleeve member 24 accommodates the stator 12 of the signal transformer device 10, which is insulated by means of an insulating ring 26 from a bottom 27 of the sleeve member 24. The end of the current-conducting support 17 is screwed into the bottom 27 of the sleeve member 24 with the aid of a screw pair 28. The ends of the winding 16 of the stator 12 extend through openings 29 provided in the bottom 27 of the sleeve member 24 and terminate outside the assembly with a plug 30.

The hollow shaft 9 is driven by a drive comprising an electromotor (not shown). The output shaft of the electromotor is engaged through a belt drive 31, extending through an opening 32 provided in the wall of the sleeve member 24, with a pulley 33 mounted on the shaft 9 which is installed in bearings 34. The bearings 34 are secured in place by thrust rings 35 and washers 36 and 37.

In the wall 3 of the housing 1 there is provided a slot 38. As the shaft 9 rotates, the magnetic heads 5 are periodically brought to the slot 38 to interact with a magnetic tape 39.

Figure 4:
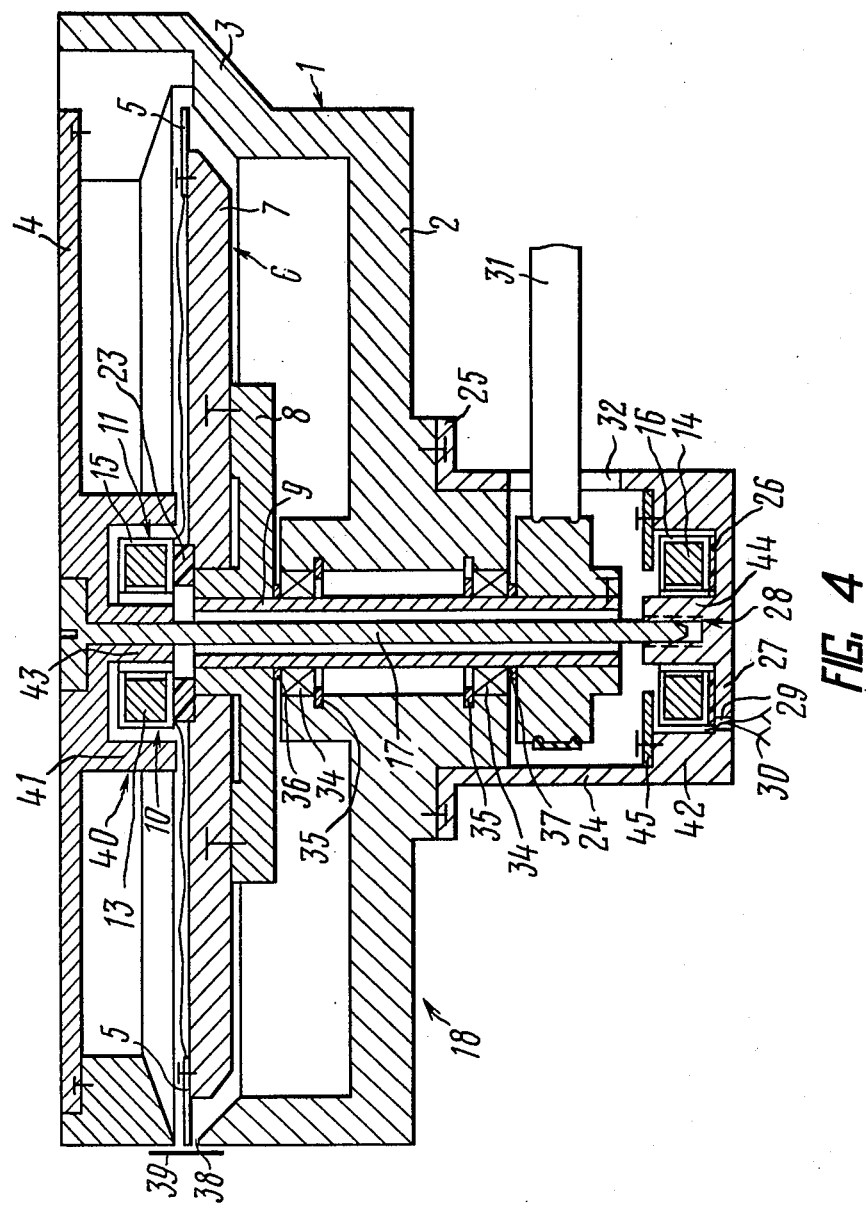
FIG. 4 is an elevational and selectional view of an alternative embodiment of a rotary magnetic head assembly in accordance with the invention.

According to the embodiment of FIG. 4, the housing 1 is provided with a means 40 for bringing the surface of the closed spatial coupling loop 18 of the windings 15 and 16 of the rotor 11 and stator 12, respectively, of the signal transformer device 10 closer to said windings 15 and 16.

In this embodiment, the means 40 comprises current-conducting rings 41 and 42, cylindrical projections 43 and 44 and a current-conducting ring-shaped plate 45. The rings 41 and 42 are arranged on the internal surfaces of the lid 4 and the bottom 27 of the sleeve member 24, respectively, coaxially with the rotor 11 and stator 12 and encompass, with a certain clearance, the external surface of the rotor 11 and stator 12. The cylindrical projections 43 and 44 are provided on the internal surfaces of the lid 4 and the bottom 27 of the sleeve member 24, respectively, and are arranged inside the rotor 11 and stator 12 coaxially with said rotor 11 and stator 12 and with a certain spacing therefrom. In this case the end of the support 17 is screwed into the projection 44. The current-conducting ring-shaped plate 45 is mounted on the current-conducting ring 42 coaxially with the stator 12 and with some spacing from the stator 12 and from the current-conducting support 17.

In the above embodiment of the rotary magnetic head assembly according to the invention, the means 40 for bringing the surface of the closed spatial coupling loop 18 of the windings 15 and 16 of the rotor 11 and stator 12, respectively, closer to the windings 15 and 16 is intended for both of said windings 15 and 16. According to alternative embodiments of the invention, said means 40 may be intended either for the rotor or the stator winding alone. For example, in the foregoing embodiment, the current-conducting ring-shaped plate 45 is additionally provided for the stator winding 16. However, if the means 40 is intended for the stator winding alone, the signal transmission coefficient is somewhat affected because of losses due to inductive leakage.

Figure 5:
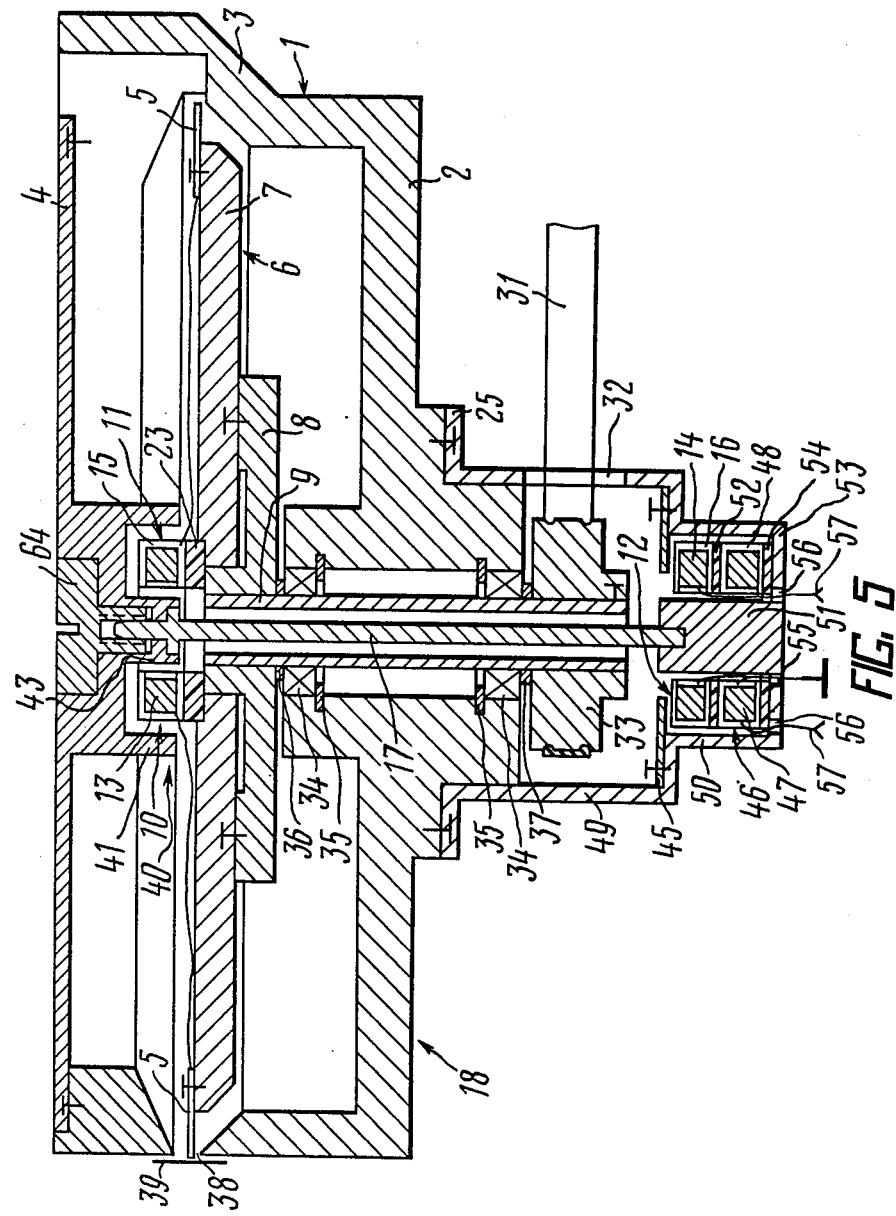
FIG. 5 is an elevation view of another alternative embodiment of a rotary magnetic head assembly in accordance with the invention.

Unlike the above embodiments, the one shown in FIG. 5 is characterized in that it includes an additional stator 46 whose core 47 is a closed ferrite magnetic circuit shaped as a cylindrical ring or a torus and encompassing the current-conducting support 17. A winding 48 is a helix, the centers of the turns being on a circumference matched with the center line of this closed magnetic circuit. The winding 48 of the stator 46 has more turns than the winding 16 of the stator 12.

The stator 46 is accommodated in a current-conducting sleeve member 49 in immediate proximity to and coaxially with the stator 12 so that a current-conducting ring 50 encompasses, with a certain clearance, the external surface of the stator 46. A current-conducting projection 51 is arranged inside the stator 46 coaxially therewith, whereby the surface of the closed spatial coupling loop 18 of the windings 15 and 16 of the rotor 11 and stator 12, respectively, of the signal transformer device 10 is brought closer to the winding 48 of the stator 46. The stators 12 and 46 are insulated from one another by an insulation spacer 52. The stator 46 is insulated from a bottom 53 of the sleeve member 49 by an insulation spacer 54.

In the embodiment under review, first ends of the windings 16 and 48 of the stators 12 and 46, respectively, extend outside the sleeve member 49 through an opening 55 provided in the bottom 53; these first ends are interconnected and grounded. The second ends of the windings 16 and 48 of the stators 12 and 46, respectively, extend outside the sleeve member 49 through openings 56 also provided in the bottom 53; the second ends are electrically connected by means of plugs 57 to switches 58 (FIG. 6) and 59, respectively. For reproduction the winding 16 of the stator 12 is shorted and grounded by its respective switch 58, and the winding 48 of the stator 46 is connected by its respective switch 59 to the reproduction channel of a conventional video tape recorder (for example, the N-1500 video tape recorded manufactured by Philips of the Netherlands). In the drawings, the reproduction channel is only represented by a conventional reproducing amplifier 60. The winding 48 serves as the secondary winding of a step-up transformer, the primary winding is the winding 15 of the rotor 11, and the core is the core 13 of the rotor 11 and the core 47 of the stator 46. For recording, the winding 16 of the stator 12 is connected by its respective switch 58 to the recording channel of the video tape recorder. In the drawings, the recording channel is only represented by a conventional recording generator 61. The winding 48 of the stator 46 is shorted and grounded by its respective switch 59.

The following description of the operation of the rotary magnetic head assembly of FIGS. 1 and 4 makes mention of some video tape recorder units, such as a switch 62 (FIG. 7), to which the winding 16 of the stator 12 is connected by means of the plug 30 (FIGS. 1 and 4); for reproduction, said switch 62 serves to connect the winding 16 (FIG. 7) via a step-up transformer 63 to the reproducing amplifier 60 of the video tape recorder; for recording, the switch 62 serves to connect the winding 16 directly to the recording generator 61.

In the embodiment of FIG. 5, one end of the current-conducting support 17 is placed in a recess provided in the current-conducting cylindrical projection 51, and the opposite end of the support 17 is secured to the lid 4 of the housing 1 by means of a nut 64.

It must be pointed out that the position of the stator 12 (FIGS. 1, 4 and 5) with respect to the rotor 11 is selected so as to conveniently connect the signal transformer device 10 to the recording and reproduction channels.

The operating principle of the rotary magnetic head assembly according to the invention is as follows.

The hollow shaft 9 (FIG. 1) and the magnetic heads 5 are set in rotation by the electromotor (not shown) through the belt drive 31. While rotating, the magnetic heads 5 periodically approach the slot 38 to interact with the magnetic tape 39. When operating in the recording mode, a video signal is applied from the recording generator 61 (FIG. 7) via the switch 62 and the signal transformer device 10 (FIG. 1) to the rotary magnetic heads 5 and is recorded on the magnetic tape 39; when operating in the reproduction mode, a video signal is read from the magnetic tape 39 by the rotary magnetic heads 5 and applied via the signal transformer device 10, the switch 62 (FIG. 7) and the step-up transformer 63 to the reproducing amplifier 60.

When recording is carried out, a video signal is applied as electric current from the recording generator 61 to the winding 16 (FIG. 1) of the stator 12 to produce a magnetic field in said winding 16. The magnitude of induction of the magnetic field is dependent upon the magnetic properties of the core 14 of the stator 12. The magnetic field induces electric current in the current-conducting support 17, as well as in the bottom 2, walls 3 and lid 4 of the housing 1, which form the closed spatial coupling loop 18 of the windings 15 and 16 of the rotor 11 and stator 12, respectively. The electric current produces a magnetic field in the loop 18, which induces electric current in the winding 15 of the rotor 11. The intensity of this current is determined by the magnetic properties of the core 13 of the rotor 11; the electric current is then applied to the magnetic heads 5. When operating in the reproduction mode, a video signal is applied from the magnetic heads 5 to the winding 16 of the stator 12 in a similar manner, from there the signal is applied via the step-up transformer 63 (FIG. 7) to the reproducing amplifier 60.

The cores 13 and 14 (FIG. 2) of the rotor 11 and stator 12, respectively, are constructed as closed ferrite magnetic circuits, and each of the windings 15 and 16 is a helix, the centers of the turns being on a circumference matched with the center line of each of the closed magnetic circuits; these factors contribute to the fullest utilization of the magnetic field in the windings 15 and 16. The cores 13 and 14 may also be closed ferrite magnetic circuits shaped as a cylindrical ring; as a result, a greater portion of the support 17 (FIG. 1), which is part of the closed spatial coupling loop 18, is encompassed by the windings 15 and 16 wound around said cores 13 and 14.

The cores 19 and 20 (FIG. 3) may be closed ferrite magnetic circuits shaped as a torus; this helps to minimize inductive leakage in the windings 21 and 22 wound around said cores 19 and 20.

The windings 15 and 16 (FIG. 2) and 21 and 22 (FIG. 3) are strip windings having a greater surface than wire windings, which helps to reduce inductive leakage in the windings. The fact that the support 17 (FIG. 1) is attached to the bottom 2 of the housing 1 by means of the sleeve member 24 helps to reduce the inductive leakage in the closed spatial coupling loop 18 and improves the noise immunity of the rotary magnetic head assembly.

According to the embodiment of FIG. 4, the rotary magnetic head assembly is provided with the means 40 for bringing the surface of the closed spatial coupling loop 18 of the windings 15 and 16 of the rotor 11 and stator 12, respectively, closer to the windings 15 and 16; this helps to concentrate the magnetic field in the area between the closed spatial coupling loop 18 and the windings 15 and 16. The shape of all the elements (the rings 41 and 42, the cylindrical projections 43 and 44, and the ring-shaped plate 45) of the means 40 is selected so as to encompass a maximum surface area of the rotor 11 and stator 12.

The embodiment of FIG. 5 features the additional stator 46, which makes it possible to use the signal transformer device 10 as a step-up transformer, whereby a single structural and functional unit, wherein a signal transformer device and a step-up transformer are combined, is produced. When operating in the recording mode, the winding 48 (FIG. 6) of the stator 46 is shorted and grounded by its respective switch 59, and the winding 16 of the stator 12 is connected by its respective switch 58 to the recording generator 61, so the whole unit operates as a signal transformer device. When operating in the reproduction mode, the unit operates as a signal transformer device which also performs the function of a step-up transformer. The winding 16 of the stator 12 is shorted and grounded by its respective switch 58, and the winding 48 of the stator 46 is connected by its respective switch 59 to the reproducing amplifier 60 and serves as the secondary winding of the step-up transformer, the primary winding of which being the winding 15 of the rotor 11, the core being the core 13 of the rotor 11 and the core 47 of the stator 46.

The winding 48 (FIG. 5) has more turns than the winding 16 of the stator 12, i.e. $L_2 > L_1$, where $L_1$ and $L_2$ are the inductances of the windings 16 and 48, respectively.

The fact that the windings 16 and 48 are shorted and grounded, depending on the operating conditions, helps to reduce losses introduced into the closed spatial coupling loop 18 by the cores 14 and 47 around which said winding 16 and 48 are wound; the overall result is reduced inductive leakage in the closed spatial coupling loop 18.

The rotary magnetic head assembly according to the invention is noiseproof and reliable in operation; and, it is easy to manufacture and operate. In this assembly, the signal transformer device and the rotor and stator cores are manufactured from ferrite and readily lend themselves to mass production, which helps to reduce the costs of manufacture.

What is claimed is:

1. A rotary magnetic head assembly, comprising:
   a current-conducting housing comprising a bottom, walls, a lid and an internal surface;
   a hollow shaft rotatably arranged in said housing;
   a holder mounted on said shaft and supporting magnetic heads;
   a contactless signal transformer device accommodated in said housing and having a rotor mounted on said holder and a stator spaced at some distance from said rotor, said rotor and stator having external surfaces, cores constructed as closed magnetic circuits, and windings constructed as helices having first ends and second ends and wound around said closed magnetic circuits so that centers of the turns of said helices are on a circumference matched with a center line of each of said closed magnetic circuits, the ends of said winding of said rotor being electrically connected to said magnetic heads; and
   a current-conducting element accommodated in said hollow shaft so that it partially comes out of that shaft and is encompassed by said closed magnetic circuits, said current-conducting element being so attached to said bottom and said lid of said housing that said lid, said walls and said bottom of said housing and said current-conducting element make up a closed spatial coupling loop of said windings of said rotor and stator.

2. A rotary magnetic head assembly as claimed in claim 1, further comprising a current-conducting sleeve member having an end face and a cavity defined by its bottom and walls, said end face being attached to said bottom of said housing, said current-conducting element being secured in said bottom of said current-conducting sleeve member, said current-conducting sleeve member, said housing and said current-conducting element forming said closed spatial coupling loop, and said stator being accommodated in said cavity of said sleeve member.

3. A rotary magnetic head assembly as claimed in claim 1, wherein said housing is provided with a means for bringing the surface of said closed spatial coupling loop of said windings of said rotor and stator of said signal transformer device closer to at least one of said windings.

4. A rotary magnetic head assembly as claimed in claim 1, wherein each of said closed magnetic circuits is shaped as a cylindrical ring.

5. A rotary magnetic head assembly as claimed in claim 1, wherein each of said closed magnetic circuits is shaped as a torus.

6. A rotary magnetic head assembly as claimed in claim 2, wherein said housing is provided with a means for bringing the surface of said closed spatial coupling loop of said windings of said rotor and stator of said signal transformer device closer to at least one of said windings.

7. A rotary magnetic head assembly as claimed in claim 2, wherein each of said closed magnetic circuits is shaped as a cylindrical ring.

8. A rotary magnetic head assembly as claimed in claim 2, wherein each of said closed magnetic circuits is shaped as a torus.

9. A rotary magnetic head assembly as claimed in claim 3, wherein said means for bringing the surface of said closed spatial coupling loop of said windings of said rotor and stator of said signal transformer device closer to said winding of said rotor comprises a current-conducting ring arranged on said internal surface of said lid of said housing coaxially with said rotor and encompassing, with a certain clearance, said external surface of said rotor.

10. A rotary magnetic head assembly according to either of claims 3 or 9, wherein said means for bringing the surface of said closed spatial coupling loop of said windings of said rotor and stator of said signal transformer device closer to said winding of said stator comprises a current-conducting ring arranged on said bottom of said sleeve member coaxially with said stator and encompassing, with a certain clearance, said external surface of said stator.

11. A rotary magnetic head assembly as claimed in claim 9, wherein said means for bringing the surface of said closed spatial coupling loop of said windings of said rotor and stator of said signal transformer device closer to said winding of said rotor comprises a current-conducting cylindrical projection provided on said internal surface of said lid of said housing and arranged inside said rotor, coaxially therewith and with a certain clearance therefrom.

12. A rotary magnetic head assembly as claimed in claim 10, wherein said means for bringing the surface of said closed spatial coupling loop of said windings of said rotor and stator of said signal transformer device closer to said winding of said stator comprises a current-conducting cylindrical projection provided on said bottom of said sleeve member and arranged inside said stator, coaxially therewith and with a certain clearance therefrom.

13. A rotary magnetic head assembly as claimed in claim 12, wherein said means for bringing the surface of said closed spatial coupling loop of said windings of said rotor and stator of said signal transformer device closer to said winding of said stator comprises a current-conducting ring-shaped plate mounted on said current-conducting ring coaxially with said stator and with a certain clearance therefrom and from said current-conducting element.

14. A rotary magnetic head assembly as claimed in claim 12, wherein said means for bringing the surface of said closed spatial coupling loop of said windings of said rotor and stator of said signal transformer device closer to said winding of said rotor comprises a current-conducting cylindrical projection provided on said internal surface of said lid of said housing and arranged inside said rotor, coaxially therewith and with a certain clearance therefrom.

15. A rotary magnetic head assembly as claimed in claim 14, wherein said means for bringing the surface of said closed spatial coupling loop of said windings of said rotor and stator of said signal transformer device closer to said winding of said stator comprises a current-conducting ring-shaped plate mounted on said current-conducting ring coaxially with said stator and with a certain clearance therefrom and from said current-conducting element.

16. A rotary magnetic head assembly, comprising:
a current-conducting housing comprising a bottom, walls, a lid and an internal surface;
a hollow shaft rotatably arranged in said housing;
a holder mounted on said shaft and supporting magnetic heads;
a contactless signal transformer device accommodated in said housing and having a rotor mounted on said holder and a first stator spaced at a certain distance from said rotor, said rotor and first stator having external surfaces, cores constructed as closed magnetic circuits, and windings constructed as helices having first ends and second ends and wound around said closed magnetic circuits so that centers of the turns of said helices are on a circumference matched with a center line of each of said closed magnetic circuits, the ends of said winding of said rotor being electrically connected to said magnetic heads;
a second stator having an external surface, a core constructed as a closed magnetic circuit, and a winding constructed as a helix, having a first end and a second end and wound around said closed magnetic circuit so that the centers of the turns of said helix are on a circumference matched with a center line of said closed magnetic circuit,
the first ends of said windings of the first stator and said second stator being interconnected and grounded;
a current-conducting element accommodated in said hollow shaft so that it partially comes out of said hollow shaft and is encompassed by all of said closed magnetic circuits, said current-conducting element being so attached to said bottom and said lid of said housing that said lid, said walls and said bottom of said housing and said current-conducting element make up a closed spatial coupling loop of said windings of said rotor and said first stator;
a first switch electrically connected to the second end of said winding of the first stator so that, when operating in the reproduction mode, said winding of said first stator is shorted and grounded, and, when operating in the recording mode, said winding is connected to a recording channel; and
a second switch electrically connected to the second end of said winding of the second stator so that, when operating in the reproduction mode, said winding of said second stator is connected to a reproduction channel and serves as the secondary winding of a step-up transformer, the primary winding of which being said winding of said rotor and the core being said core of said rotor and said core of said second stator, and, when operating in the recording mode, said winding of said second stator is shorted and grounded.

17. A rotary magnetic head assembly as claimed in claim 16, further comprising a current-conducting sleeve member having an end face and a cavity defined by its bottom and walls, said end face being attached to said bottom of said housing, said current-conducting element being secured in said bottom of said current-conducting sleeve member, said current-conducting sleeve member, said housing and said current-conducting element forming said closed spatial coupling loop, and said stators being accommodated in said cavity of said current-conducting sleeve member.

18. A rotary magnetic head assembly as claimed in claim 16, wherein said housing is provided with a means for bringing the surface of said closed spatial coupling loop of said windings of said rotor and said first stator of said signal transformer device closer to at least one of said windings.

19. A rotary magnetic head assembly as claimed in claim 16, wherein each of said closed magnetic circuits is shaped as a cylindrical ring.

20. A rotary magnetic head assembly as claimed in claim 16, wherein each of said closed magnetic circuits is shaped as a torus.

21. A rotary magnetic head assembly as claimed in claim 16, wherein said winding of the second stator has more turns than said winding of the first stator.

22. A rotary magnetic head assembly as claimed in claim 17, wherein said housing is provided with a means for bringing the surface of said closed spatial coupling loop of said windings of said rotor and said first stator of said signal transformer device closer to at least one of said windings.

23. A rotary magnetic head assembly as claimed in claim 18, wherein said means for bringing the surface of said closed spatial coupling loop of said windings of said rotor and said first stator of said signal transformer device closer to said winding of said rotor comprises a current-conducting ring arranged on said internal surface of said lid of said housing coaxially with said rotor and encompassing, with a certain clearance, said external surface of said rotor.

24. A rotary magnetic head assembly according to either of claims 18 or 19, wherein said means for bringing the surface of said closed spatial coupling loop of said windings of said rotor and said first stator of said signal transformer device closer to said winding of said second stator comprises a current-conducting ring arranged on said bottom of said sleeve member coaxially with said second stator and encompassing said external surface of said second stator.

25. A rotary magnetic head assembly as claimed in claim 19, wherein said means for bringing the surface of said closed spatial coupling loop of said windings of said rotor and said first stator of said signal transformer device closer to said winding of said rotor comprises a current-conducting cylindrical projection provided on said internal surface of said lid of said housing and arranged inside said rotor coaxially therewith and with a certain clearance therefrom.

26. A rotary magnetic head assembly as claimed in claim 20, wherein said means for bringing the surface of said closed spatial coupling loop of said windings of said rotor and said first stator of said signal transformer device closer to said winding of said second stator comprises a current-conducting cylindrical projection provided on said bottom of said sleeve member and arranged inside said second stator coaxially therewith and with a certain clearance therefrom.

27. A rotary magnetic head assembly as claimed in claim 26, wherein said means for bringing the surface of said closed spatial coupling loop of said windings of said rotor and said first stator of said signal transformer device closer to said winding of said second stator comprises a current-conducting ring-shaped plate mounted on said current-conducting ring coaxially with said second stator and with a certain clearance therefrom and from said current-conducting element.

28. A rotary magnetic head assembly as claimed in claim 27, wherein the second stator is accommodated in said current-conducting sleeve member in immediate proximity to the first stator and coaxially therewith so that said current-conducting ring encompasses said external surface of the second stator; said current-conducting cylindrical projection being arranged inside said second stator coaxially therewith, whereby the surface of said closed spatial coupling loop of said windings of said rotor and said first stator of said signal transformer device is brought closer to said winding of the second stator.

29. A rotary magnetic head assembly as claimed in claim 26, wherein said means for bringing the surface of said closed spatial coupling loop of said windings of said rotor and said first stator of said signal transformer device closer to said winding of said rotor comprises a current-conducting cylindrical projection provided on said internal surface of said lid of said housing and arranged inside said rotor coaxially therewith and with a certain clearance therefrom.

30. A rotary magnetic head assembly as claimed in claim 29, wherein said means for bringing the surface of said closed spatial coupling loop of said windings of said rotor and said first stator of said signal transformer device closer to said winding of said second stator comprises a current-conducting ring-shaped plate mounted on said current-conducting ring coaxially with said second stator and with a certain clearance therefrom and from said current-conducting element.

* * * * *